(12) United States Patent
Huang

(10) Patent No.: US 8,317,320 B2
(45) Date of Patent: Nov. 27, 2012

(54) SPECTACLE FRAME WITH VISION TRAINING FUNCTION

(75) Inventor: Vic Huang, Hangzhou (CN)

(73) Assignee: Hangzhou Light of Hope Eye Care Co., Ltd., Hangzhou, Zhejiang Province (CN)

( * ) Notice: Subject to any disclaimer, the term of this patent is extended or adjusted under 35 U.S.C. 154(b) by 30 days.

(21) Appl. No.: 13/125,903

(22) PCT Filed: Sep. 19, 2010

(86) PCT No.: PCT/CN2010/077098
§ 371 (c)(1),
(2), (4) Date: Apr. 25, 2011

(87) PCT Pub. No.: WO2011/047586
PCT Pub. Date: Apr. 28, 2011

(65) Prior Publication Data
US 2011/0205484 A1    Aug. 25, 2011

(30) Foreign Application Priority Data

Oct. 24, 2009    (CN) .......................... 2009 1 0209988

(51) Int. Cl.
  *G02C 1/00*    (2006.01)
(52) U.S. Cl. ....................................... 351/158; 362/103
(58) Field of Classification Search .................. 351/158, 351/41, 121, 111; 362/103, 105, 800
See application file for complete search history.

(56) References Cited

U.S. PATENT DOCUMENTS

| | | | |
|---|---|---|---|
| 4,254,451 A * | 3/1981 | Cochran, Jr. .................. | 362/103 |
| 5,092,669 A | 3/1992 | Anderson | |
| 6,997,552 B1 * | 2/2006 | Hung ............................... | 351/51 |
| 7,438,409 B2 * | 10/2008 | Jordan ........................... | 351/158 |
| 7,607,775 B2 * | 10/2009 | Hermanson et al. .......... | 351/158 |
| 7,699,486 B1 * | 4/2010 | Beiner ............................ | 362/105 |
| 2005/0213035 A1 | 9/2005 | Yoshimeki et al. | |
| 2009/0156886 A1 | 6/2009 | Burgio et al. | |

FOREIGN PATENT DOCUMENTS

| | | |
|---|---|---|
| CN | 101259071 A | 9/2008 |
| CN | 201157504 Y | 12/2008 |
| CN | 101695463 A | 4/2010 |
| WO | WO01/64005 A2 | 9/2001 |
| WO | WO2006111735 A2 | 10/2006 |

* cited by examiner

*Primary Examiner* — Hung Dang
(74) *Attorney, Agent, or Firm* — Jacobson Holman PLLC

(57) ABSTRACT

This invention discloses a spectacle frame with the function of vision training, including frame members, a nose bridge, temple connecting extensions and spectacle legs. The frame, nose bridge and spectacle legs are provided with LED illuminant bodies. One spectacle leg is provided with a regulating switch and the other spectacle leg is provided with a battery cell and a charging hole. The nose bridge and spectacle legs are provided with chips to control the LED illuminant bodies to flash or extinguish in order according to a program. The LED illuminant bodies, chip, battery and regulating switch are interlinked via a flexible board. The angle between the spectacle frame and spectacle legs can be freely adjusted in the range of 180°. When the angle is 180°, all the LED illuminant bodies on spectacle legs and nose bridge are aligned in one straight line. This invention effectively combines multi-vision training and 3-color ball training with the spectacle frame and can be used to train eyeballs to move toward different directions, thus fully exercising eye muscle. The spectacle frame of this invention is simple in structure, convenient for use and carrying and able to improve visual acuity, ease the fatigue of eye muscle, improve visual quality and control myopia.

10 Claims, 4 Drawing Sheets

SPECTACLE FRAME WITH VISION TRAINING FUNCTION

This is a U.S. national stage application of PCT Application No. PCT/CN/2010/077098 under 35 U.S.C. 371, filed Sep. 19, 2010 and published in Chinese, claiming the priority benefit of Chinese Application No. 200910209988.1, filed Oct. 24, 2009, which is hereby incorporated by reference.

FIELD OF THE INVENTION

The present invention relates to a spectacle frame, and more specially relates to a spectacle frame that is designed for multiple vision training of eyeball-moving and is able to effectively overcome asthenopia and control myopia.

DESCRIPTION OF THE PRIOR ART

People receive more than 80% information by eyes. With the rapid development of science and technology, more and more people need long-term working with eyes in close quarter. Now the number of myopia patients in Chinese student has increased to be the highest in the world and this number seems to increase and includes students at lower ages year after year. Myopia has become the most severe problem to harm the health of Chinese students.

Less eyeball movement is one of the important factors that contribute to myopia. Lacking exercise and paying attention to book, computer and other objects in close quarters for a long time bring a pressure to eyes, causing the fatigue or even spasm of ciliary muscle, blurrier vision, shorter visual distance and gradually myopia.

Once true myopia is formed, wearing spectacles is the choice for most people. When a person wears common spectacles, there is a fixed optical center in front of each eye, respectively. Unfortunately, both eyes must fixate objects clear through the optical center of the spectacles. Wearing such spectacles can supplement the degrees required by refractive power to match eye axis with the refractive power so that the people wearing spectacles can improve their eyesight and fixate objects at far distance clearly.

However, wearing spectacles in working and life for a long time considerably restricts the opportunities of normal eyeball movement. Modern neuro-ophthalmology regards the eyes as the extension of the brain. Only when eyeballs track a moving object, can the blood supply in related pallium increase to help the necessary blood-oxygen exchange for eyes and brain.

In multi-vision training based on the theory of moving vision, the eyeball-moving training fully brings the rolls of three factors (brain, eye, light) in visual course into full play, allowing the eyes, brain and hands to get harmonization through exercise, protecting eye accommodation and effectively preventing and controlling the myopia.

Eye gymnastics (a set of movement eye gym to prevent and control myopia introduced in *Multi-vision Training* published by People's Sanitation Press in January 2009) incite eyeballs to move toward each direction so as to relax and retract eye muscle continuously, thus enhancing its expansion ability, overcoming eye muscle fatigue and achieving the goal of preventing and controlling myopia. However, the shortcoming of the gym is large action of body movement that is apt to arouse the attention of others. It is applicable to school, home or training place but not convenient for vision training whenever and wherever possible.

At present, there is a device for multi-vision plane training in prior art. The device is similar to a common display screen in shape and can be used to train both eyes to fixate different directions respectively in restricted time and fixate far point and near point alternately and continuously to fully move eyeballs and exercise extraocular muscles, thus helping overcoming asthenopia and effectively preventing and controlling myopia. The shortcoming of this device is its large size that is inconvenient for daily carrying, thus overwhelmingly restricting the opportunity of children's vision training.

There is also a vision training method known as "3-color crossing movement". The method needs a long rope with three balls tied in order: green, yellow and red. A user can strain one end of the rope with a hand, slightly higher than the user's apparent horizon. The user places the end near his or her apex of nose. The user fixes the other end of the rope. Then the user fixate the green ball from far to near with both eyes, uniformly moving the line of sight until the user sees the phenomenon of crossed two ropes, then repeats the procedure for yellow and red balls respectively. Such training can enhance the function of light perception and focusing for both eyeballs and eliminate the problem of fusional divergence. As the training using the rope tied with three balls needs a large place and probably affects other people, the vision training of "3-color crossing movement" is often restricted.

In the case of emmetropia, the focus of yellow light right falls on the retina, while the focus of red light falls after the retina and the focus of green light falls before the retina, with a basically equivalent distance from the red and green light to the retina. Therefore, the image sharpness formed on the retina by the red light is basically equivalent to that by green light.

SUMMARY OF THE INVENTION

An object of this invention is to overcome the shortcomings in prior art by providing a spectacle frame combining the current theory of multi-vision training, modern optics, electronic technology and neuro-ophthalmology. Such a spectacle frame can, in the simplest and most effective way, promote eyeball movement, strengthen the expansion ability of extraocular muscles and overcome the eye muscle fatigue caused by fixating near objects for a long time. The spectacle frame enables wearers to make the exercise of eyeball movement whenever and wherever possible and really achieve the goal of overcoming asthenopia, improving eyesight and visual quality and controlling myopia.

A spectacle frame with the function of vision training includes frame members holding lenses, a nose bridge, temple connecting extensions and spectacle legs. The frame members, nose bridge and spectacle legs are provided with LED illuminant bodies. One spectacle leg is provided with a regulating switch and the other spectacle leg is provided with a battery cell and a charging hole. The nose bridge and spectacle legs are provided with electronic chips to control the LED illuminant bodies to flash or extinguish in the sequence according to a program. The LED illuminant bodies, chip, battery and regulating switch are interlinked via a flexible board. The angle between the spectacle frame and spectacle legs can be freely adjusted in the range of 180°. When the angle is 180°, all the LED illuminant bodies on spectacle legs and nose bridge are aligned in one straight line.

The temple connecting extensions are connected with the spectacle legs via spring hinges, so that the angle between the spectacle frame and spectacle legs can be freely adjusted in the range of 180°. When the angle is turned to 180°, the spectacle frame and spectacle legs are aligned at a same plane.

The preferred illuminant bodies are LED lights.

Preferably, the left and right frame members of this invention are provided with five LED illuminant bodies respectively locating at upper left position, lower left position, upper right position, lower right position and spectacle frame member near temple connecting extension respectively, and being green, yellow and red in the order from nose to temporal. The light of different color can stimulate the cone cells in macular area of eye, strengthen central fixation and promote the function of binocular fusion.

Preferably, a LED illuminant body is provided at the center of the nose bridge.

The LED illuminant bodies on the spectacle legs are provided at inside or outside of the spectacle legs.

The LED illuminant bodies on the nose bridge and spectacle legs are green, yellow and red illuminant bodies.

The spectacle legs are preferably telescopic and can be stretched to change the spans between LED illuminant bodies in vision training.

The spectacle legs are preferably made of material with memory.

The battery is a rechargeable battery. The battery is installed in the battery cell. The battery charging hole provided in the spectacle leg of this invention can be directly used for battery charging.

The spectacle frame can serve for common spectacles with common lens and can also serve for myopia control spectacles with progressive additional lens. When the spectacle frame is used for vision training device, the user can turn on the regulating switch. The LED illuminant bodies in the spectacle frame and spectacle legs will flash in order. The user can rotate his or her eyeballs along the direction indicated by the LED illuminant bodies and continuously relax and retract eye muscle. When eyeballs move toward each direction, six extraocular muscles regularly retract and diastolize, thus producing subatmospheric pressure and forcing the aqueous humor, blood and tissue fluid to flow back into cranium smoothly to improve the physiological environment inside the eyeball effectively and accelerate the discharging of acidic metabolite out of the eyes.

The computerized chip in the spectacle frame of this invention can control the LED illuminant bodies to flash or extinguish in the sequence predetermined by a program. When the user wears the spectacles, several LED illuminant bodies in the frame and legs will flash in order. Now the user's eyeballs should rotate along the direction indicated by the LED illuminant bodies, thus effectively exercising the clockwise and counterclockwise rotational ability of six extraocular muscles and overcoming asthenopia. The user can also remove the spectacles, stretch two spectacle legs toward both sides and render the frame and legs at a same plane in order to conduct the training of far and near points. The LED illuminant bodies in the frame and legs are aligned in a same straight line and flash in order. The user's eyeballs should follow the movement of LED illuminant bodies, force both eyes to conduct the regulating training of fixating far and near objects, enhance binocular ability of fixating far objects and correct long-term status of fixating near objects. The user can place two spectacle legs in tandem for simple 3-color ball training. The eyeball movement with the feature of fixating and tracking significantly promote the blood flow of visual cortex and visual pathway and help overcoming asthenopia and improving visual acuity.

The spectacle frame of this invention can be used to train eyeballs to perform regular visual movement (including convergence, regulation, fixation, saccade and tracking) toward different directions to fully exercise eye muscles, promote binocular fixating ability, maintain normal function of extraocular muscles and harmonize moving ability.

This invention can combine far point training, near point training, 3-color ball training, vertical fixating training with the spectacles to facilitate users to conduct vision training whenever and wherever possible. The spectacle frame of this invention is simple in structure, convenient for use and carrying and able to improve visual acuity and control myopia.

In the above figures, 1, 2—spectacle frame; 3—nose bridge; 4—temple bending; 5, 6—spectacle legs; 7—illuminant body; 8—nose pads; 9—regulating switch; 10—battery chamber; 11—battery charging hole; 12—battery; 13—spring hinge; 14—telescopic device.

The above and other objects, features and advantages of the present invention will be more clearly understood from the following detailed description taken in conjunction with the accompanying drawings.

DETAILED DESCRIPTION OF THE PREFERRED EMBODIMENTS

Embodiment 1

Figure 1:
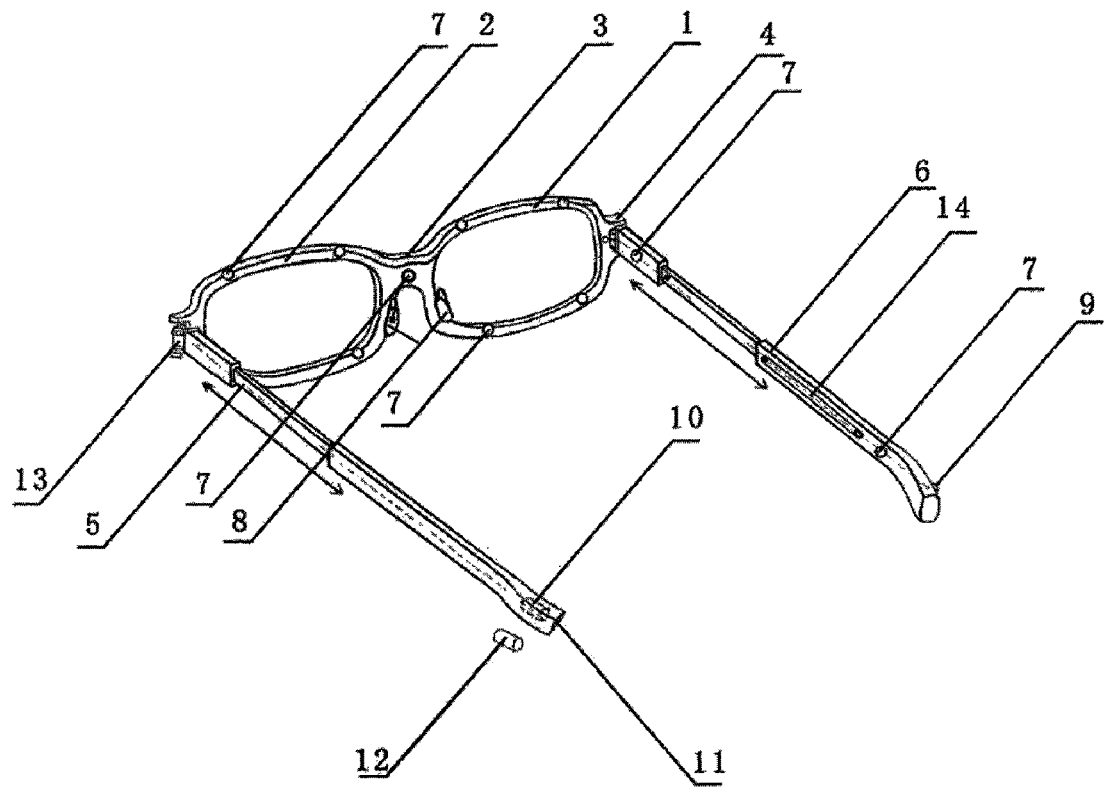
FIG. 1 is a schematic structural representation of an embodiment of the invention.

As shown in FIG. 1, this invention includes spectacle frame members 1, 2, a nose bridge 3, temple connecting extensions 4, spectacle legs 5 and 6. The spectacle frame 1 and 2 are provided with five LED illuminant bodies 7 respectively. These LED illuminant bodies 7 locate at the upper left position, lower left position, upper right position, lower right position and spectacle frame near temple connecting extension 4 respectively, and are green, yellow and red in order from nose to temporal. Another LED illuminant body 7 is provided at the center of inner side of the nose bridge 3. The spectacle legs 5 and 6 are provided with two LED illuminant bodies 7 at inner sides respectively. The spectacle frame is provided with a pair of nose pads 8. The spectacle leg 5 is provided with chips (not shown in the figures) and a regulating switch 9 to control the LED illuminant bodies 7 to flash or extinguish in preprogrammed sequence. The spectacle leg 6 is provided with a chamber 10 for installing a battery 12, and a battery charging hole 11. The LED illuminant bodies 7, chip, battery 12 and regulating switch 9 are interlinked via a flexible electronic circuit board (not shown in the figures).

Figure 6:
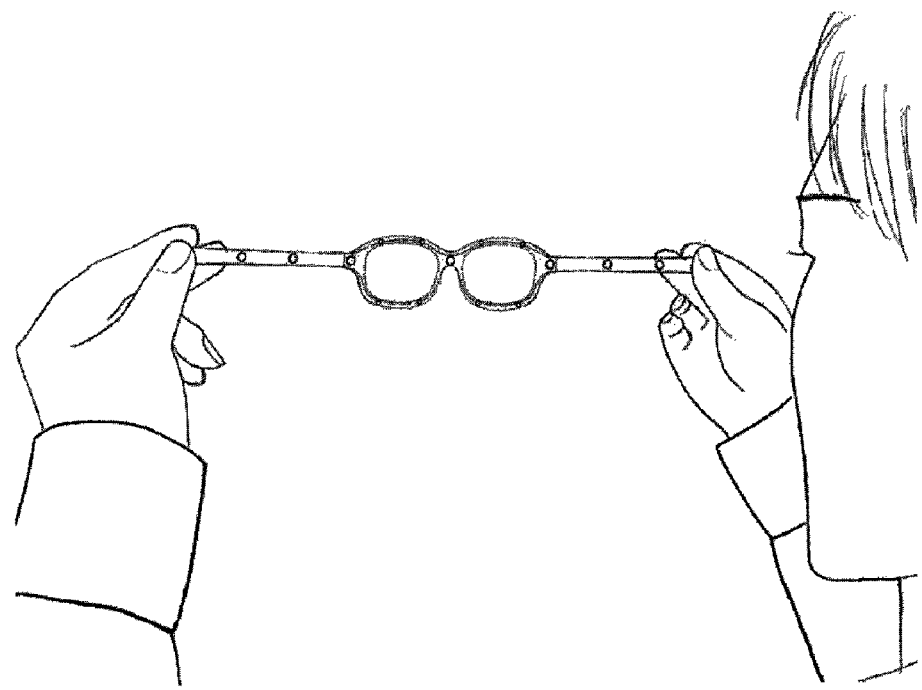
FIG. 6 is a schematic representation of using the spectacle frame for far points training.

The temple connecting extensions 4 are connected with the spectacle legs 5, 6 via metal spring hinge 13 (as shown in FIG. 6). The angle between the spectacle frame and spectacle legs can be freely adjusted in the range of 180°. When the angle is 180°, all the LED illuminant bodies 7 on spectacle legs 5, 6 and nose bridge 3 are aligned in one straight line.

The spectacle legs 5, 6 have a telescopic structure with the telescopic devices 14. When a user presses the circular boss of the telescopic device near the temple connecting extension, a locker is disengaged so that the spectacle leg can be drawn out transversely. When it is drawn out to a certain position, another circular boss near the end of spectacle leg will engage with the locker to fix the length of spectacle leg. In a similar manner, when a user presses the circular boss once again, the spectacle leg retreats to its former length. During the vision training, drawing out the spectacle leg will change the span between LED illuminant bodies on the spectacle leg.

Figure 2:
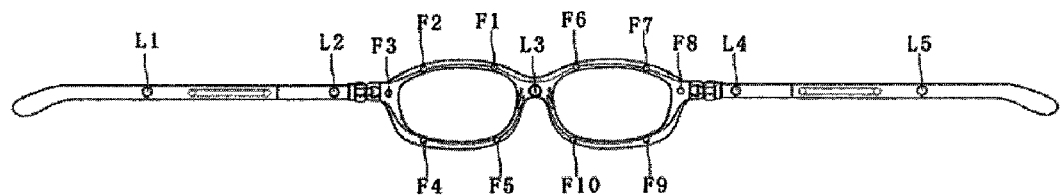
FIG. 2 is a schematic representation of the positions of illuminant bodies in spectacle frame.

FIG. 2 is a schematic view of the positions of LED illuminant bodies on the spectacle frame.

Figure 3:
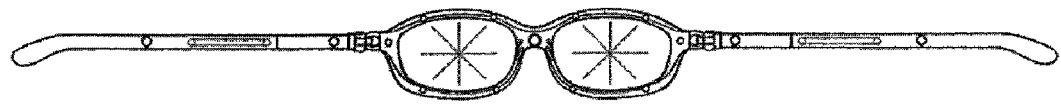
FIG. 3 is a schematic layout of 10 illuminant bodies in double cross pattern.

As shown in FIG. 3, LED illuminant bodies F1, F2, F3, F4, F5, F6, F7, F8, F9, and F10 form a double cross pattern together with the optical center of spectacle frame.

Figure 4:
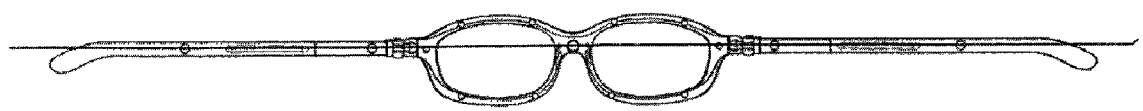
FIG. 4 is a schematic representation of illuminant bodies on nose bridge and two spectacle legs aligned in a straight line.
Figure 5:
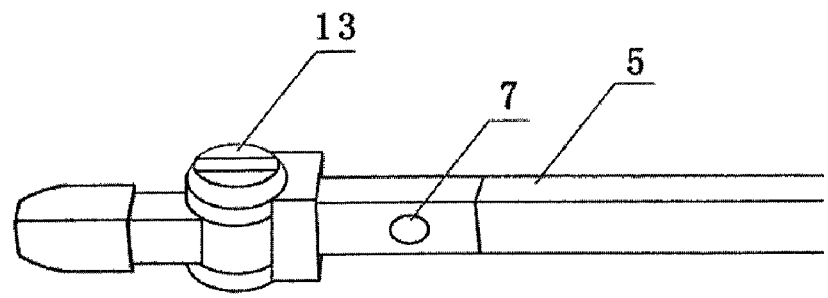
FIG. 5 is a schematic representation of the spring hinge.

As shown in FIG. 4, LED illuminant bodies L1, L2, L3, L4, and L5 are aligned in one horizontal straight line that passes two spectacle legs and the nose bridge.

The spectacle frame can serve for common spectacles with common lenses and can also serve for myopia control spectacles with progressive additional lenses. When serving as vision training instrument, the spectacle frame can provide many ways.

FIG. 6 is a schematic representation using the spectacle frame for far points training. The user stretches the spectacle legs 5 and 6 to two sides and keeps it at the same horizontal level as the spectacle frame members. The spectacle frame members should be placed at 7-10 cm away from the eyes. The user should relax his/her eyes and fixate a distant place. Then he/she should turn on the switch and the LED illuminant bodies will flash in order as programmed by the chip. When the LED illuminant body begins to flash, he/she should rotate his/her eyeballs to follow the flashing point. When one LED illuminant body flashes, both his/her eyes should fixate this flashing point. When two flashing points being symmetrical in left and right sides flash simultaneously, the user's two eyes should rapidly fixate his/her front (far distance) with split vision of both eyes seeing the left and right flashing points simultaneously. The user only needs rotating his eyeballs without moving his/her head, thus making the best training effect. When using split vision of both eyes to see the left and right flashing points simultaneously, the user can obtain the positions of both eyes that most approach the real state of fixating a distance. Far points training can also be performed at a normal state of wearing the spectacles.

Figure 7A:
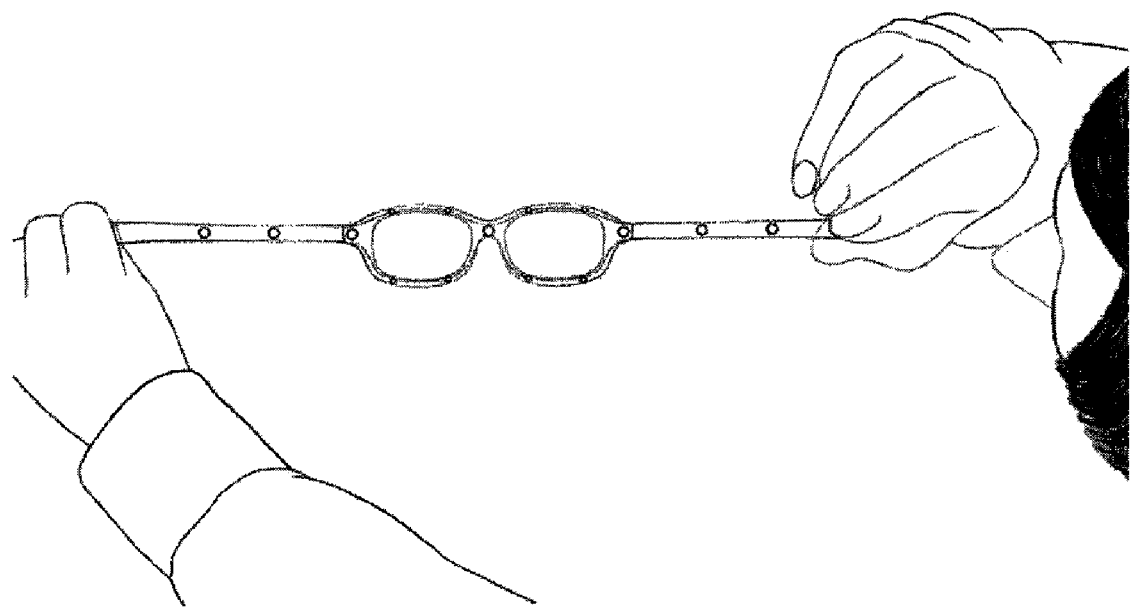
FIG. 7a is a vertical view of using the spectacle frame for near points training.
Figure 7B:
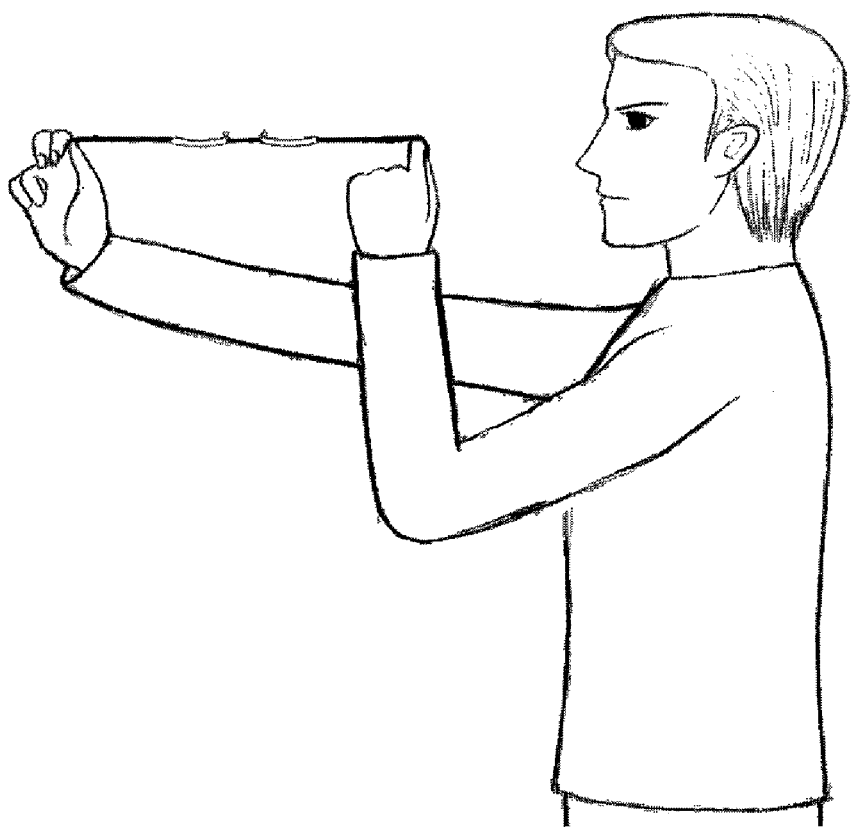
FIG. 7b is a side view of using the spectacle frame for near points training.

FIGS. 7a and 7b are vertical and side schematic views of near points training using the spectacle frame of this invention. The user should place the horizontally stretched spectacle frame vertically to his/her two shoulders. The spectacle legs stretched fore and after should be at the same horizontal level as the spectacle frame. Then he/she should turn on the switch and the LED illuminant bodies will flash in order as programmed by the chip. He/she should rotate his/her eyeballs in accordance with the flashing positions of LED illuminant bodies.

Figure 8:
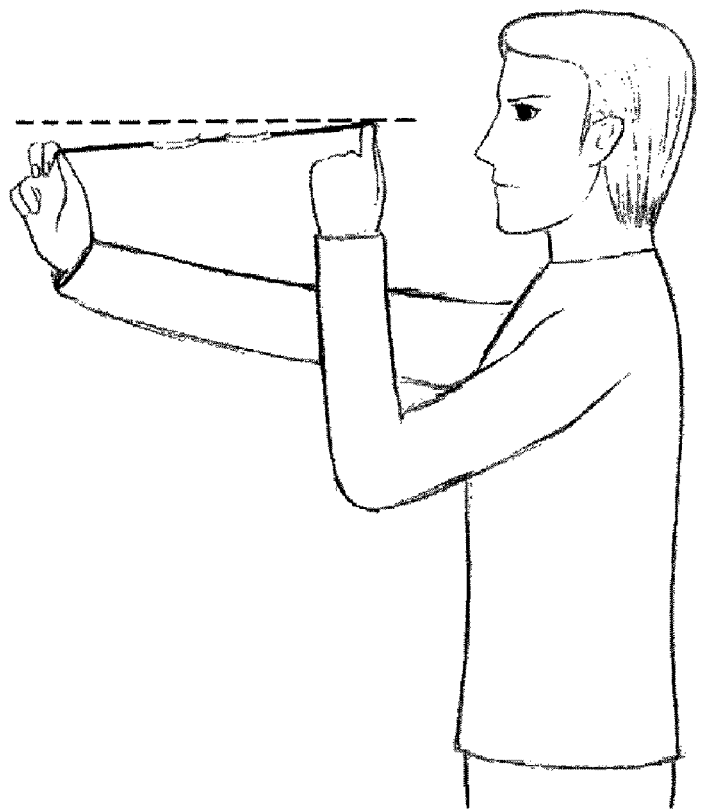
FIG. 8 is a schematic representation of using the spectacle frame for 3-color ball training.

FIG. 8 is a schematic view of 3-color ball training using the spectacle frame of this invention. The user should place the stretched spectacle frame at a 15° angle to horizontal level. Then he/she should turn on the switch and the LED illuminant bodies will flash in order as programmed by the chip. He/she should concentratedly fixate the flashing lights in accordance with the flashing positions.

Figure 9:
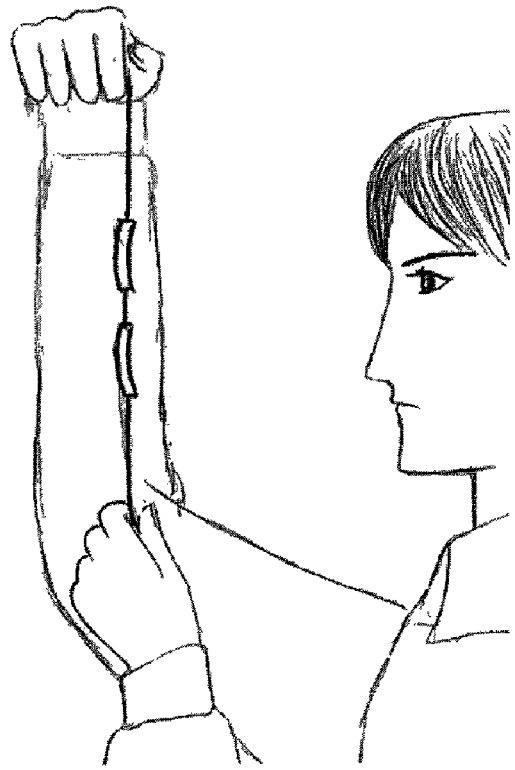
FIG. 9 is a schematic representation of using the spectacle frame for vertical vision training.

The user can also perform vertical training as shown in FIG. 9 using the spectacle frame of this invention. He/she should place the spectacles in longitudinal state and turn on the switch. The LED illuminant bodies will flash in order as programmed by the chip. He/she should concentratedly fixate the flashing lights in accordance with the flashing positions.

The light variation in above-mentioned training includes fade in and fade out.

Embodiment 2

Except that the chip is placed at the nose bridge, this embodiment is the same as embodiment 1.

All the trainings discussed in this invention focus the eyeball movement. The user should keep his/her head fixedly and only rotate his/her eyes. His eyeballs should rotate along the flashing points, thus achieving the best training effect.

In the vision training using the spectacle frame of this invention, eyeballs make regular movement toward different directions to relax and retract eye muscle continuously. When eyeballs move toward different directions, regular retraction and diastolization of six extraocular muscles enable the aqueous humor, blood and tissue fluid inside the eyeballs to flow back into cranium smoothly to improve the physiological environment inside the eyeball effectively, accelerate the discharging of acidic metabolite out of the eyes, and improve the capability of both eyes to track and fixate goals and normal function of extraocular muscles and capability of coordination exercise. The eyeball movement with the feature of fixating and tracking significantly promote the blood flow of visual cortex and visual pathway and help overcoming asthenopia and improving visual acuity.

The spectacle frame of this invention is simple in structure, convenient for use and carrying and able to ease eye muscle fatigue, improve visual quality and control myopia.

The invention claimed is:

1. A spectacle frame with the function of visual training comprising frame members for holding lenses, a nose bridge, temple connecting extensions and spectacle legs; wherein the frame members, the nose bridge and the spectacle legs are provided with LED illuminant bodies; one of the spectacle legs is provided with a regulating switch and the other of the spectacle legs is provided with a battery cell and a charging hole; the nose bridge and the spectacle legs provided with electronic chips to control the LED illuminant bodies to flash or extinguish in an order determined by a program; the LED illuminant bodies, chip, battery and regulating switch interlinked via a flexible electronic board; an angle between the spectacle frame and spectacle legs being able to be freely adjusted is in the range of 180°; when the angle is 180°, all the LED illuminant bodies on spectacle legs and nose bridge are aligned in a straight line.

2. The spectacle frame as set forth in claim 1, wherein the temple connecting extensions are linked with spectacle legs via spring hinges.

3. The spectacle frame as set forth in claim 2, wherein the illuminant bodies are LED or EL lights.

4. The spectacle frame as set forth in claim 3, wherein the left and right frame members are provided with five LED illuminant bodies respectively locating at upper left position, lower left position, upper right position, lower right position and spectacle frame member near temple connecting extension respectively, and being green, yellow and red in order from nose to temporal.

5. The spectacle frame as set forth in claim 4, wherein at least a LED illuminant body is provided at the center of the nose bridge.

6. The spectacle frame as set forth in claim 5, wherein at least a LED illuminant body is provided at inside or outside of the spectacle legs.

7. The spectacle frame as set forth in claim 4, wherein the LED illuminant bodies on the nose bridge and spectacle legs are green, yellow and red illuminant bodies.

8. The spectacle frame as set forth in claim 7, wherein the spectacle legs are of a telescopic structure.

9. The spectacle frame as set forth in claim 8, wherein the spectacle legs are made of a material with memory.

10. The spectacle frame as set forth in claim 9, wherein the battery is a rechargeable battery.

* * * * *